June 26, 1956 T. I. PRZYSIECKI 2,752,414

ANSWER BACK DEVICE FOR PRINTING TELEGRAPH SYSTEMS

Filed Sept. 16, 1952 4 Sheets-Sheet 1

INVENTOR
THEODORE I. PRZYSIECKI
BY Emery Robinson
ATTORNEY

June 26, 1956 T. I. PRZYSIECKI 2,752,414

ANSWER BACK DEVICE FOR PRINTING TELEGRAPH SYSTEMS

Filed Sept. 16, 1952 4 Sheets-Sheet 2

INVENTOR
THEODORE I. PRZYSIECKI
BY Emery Robinson
ATTORNEY

June 26, 1956 T. I. PRZYSIECKI 2,752,414

ANSWER BACK DEVICE FOR PRINTING TELEGRAPH SYSTEMS

Filed Sept. 16, 1952 4 Sheets-Sheet 3

INVENTOR
THEODORE I. PRZYSIECKI
BY Emery Robinson
ATTORNEY

June 26, 1956 T. I. PRZYSIECKI 2,752,414

ANSWER BACK DEVICE FOR PRINTING TELEGRAPH SYSTEMS

Filed Sept. 16, 1952 4 Sheets-Sheet 4

INVENTOR
THEODORE I. PRZYSIECKI
BY Emery Robinson
ATTORNEY

United States Patent Office 2,752,414

Patented June 26, 1956

2,752,414

ANSWER BACK DEVICE FOR PRINTING TELEGRAPH SYSTEMS

Theodore I. Przysiecki, Park Ridge, Ill., assignor to Teletype Corporation, Chicago, Ill., a corporation of Delaware Application September 16, 1952, Serial No. 309,755

2 Claims. (Cl. 178—4)

Figure 1:
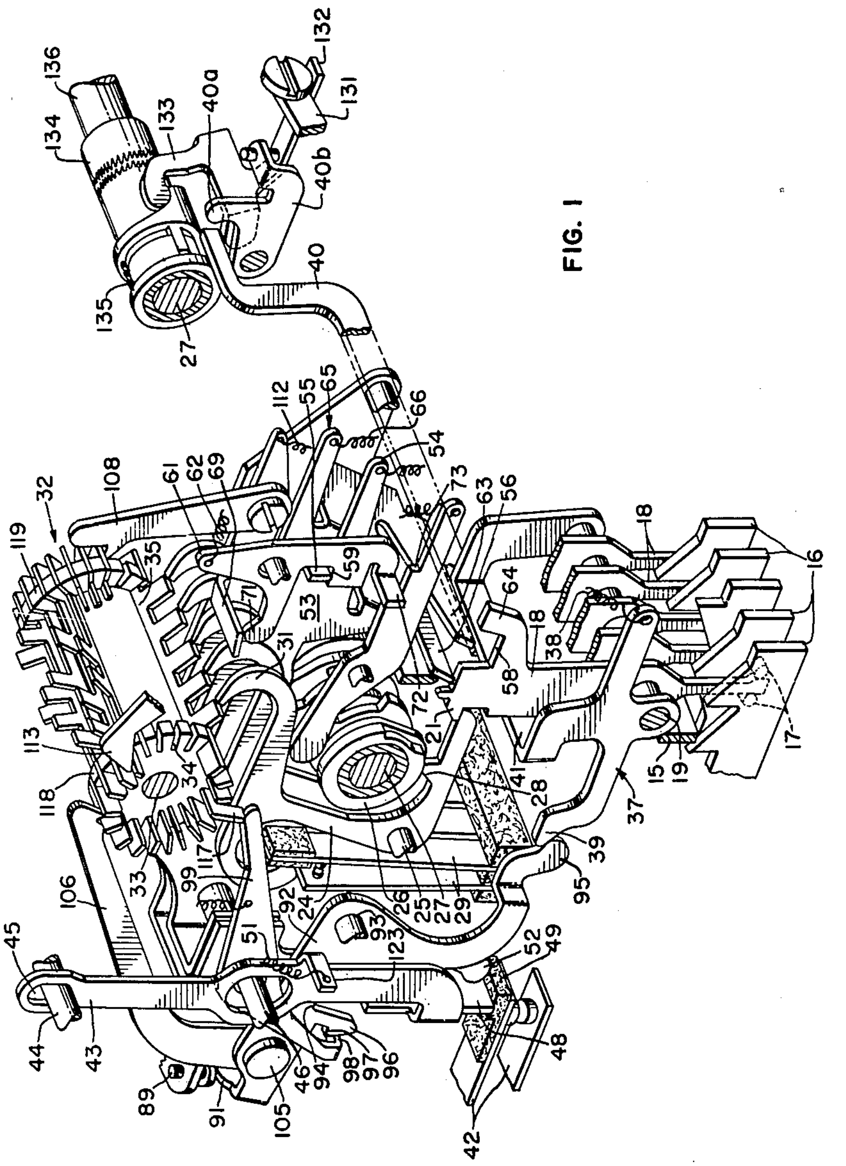

In printing telegraph communication systems it is desirable for called stations to respond automatically to an inquiry signal for the purpose of verifying the accuracy of the line connection by sending back to the calling station its identification signal or other intelligence message according to a prearranged denotation. The present invention concerns itself with the provision of auxiliary mechanism for installation upon existing classes of automatic telegraph printing equipment which will accomplish the transmission of such identification signals in response to calling station control.

A principal object of this invention is to provide an auxiliary automatic telegraph signal transmitting apparatus which will respond to an identification inquiring signal incoming over the line by causing to be generated a series of prearranged identification or other intelligence signals indicative characteristically of the called station and at the same time effecting certain supervisory regulation such as preventing the operation of the keyboard equipment at both the calling and called stations, and preventing the generation of only the calling station answer-back signals during the interim in which the automatic identification of the called station is performed.

Another object of this invention is to produce an auxiliary, message transmitting apparatus which is automatically responsive to incoming line signals in accordance with a pre-established sequence of operations and by setting up safeguards against interference with or mutilation of automatic answer-back or identification messages as may result from attempts at local keyboard operation at either the calling or called station during the interim of the automatic response.

Figure 3:
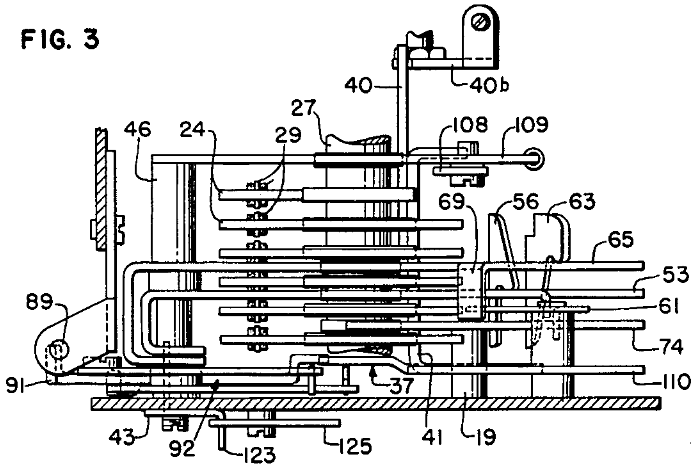
Figure 2:
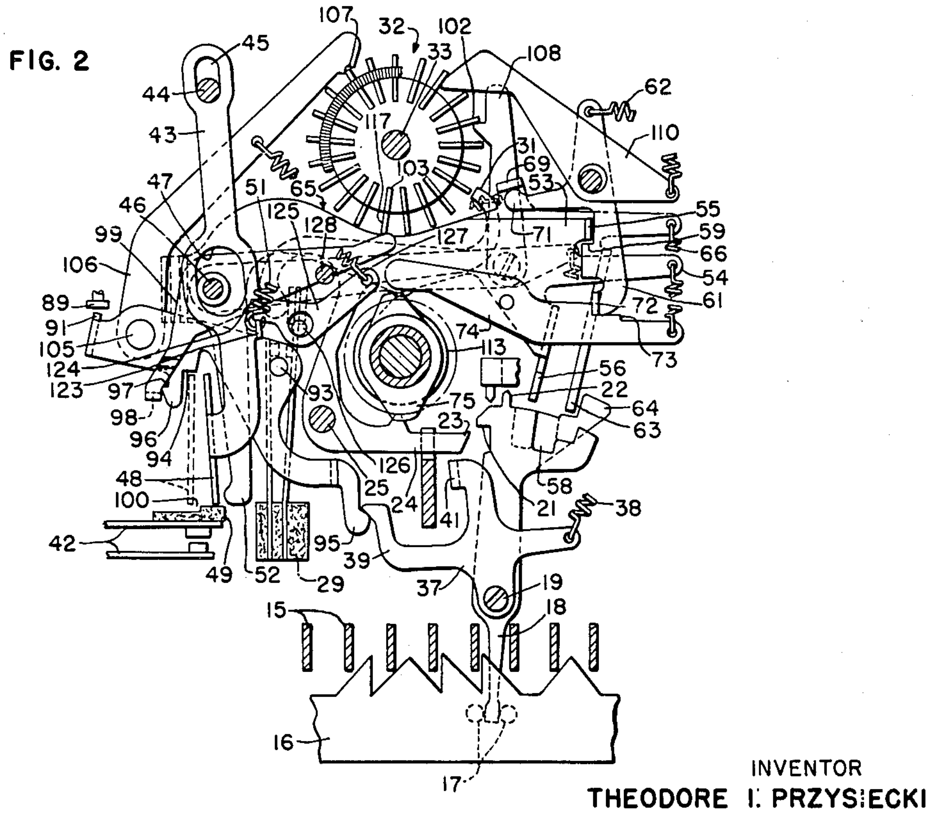
Figures 4, 5:
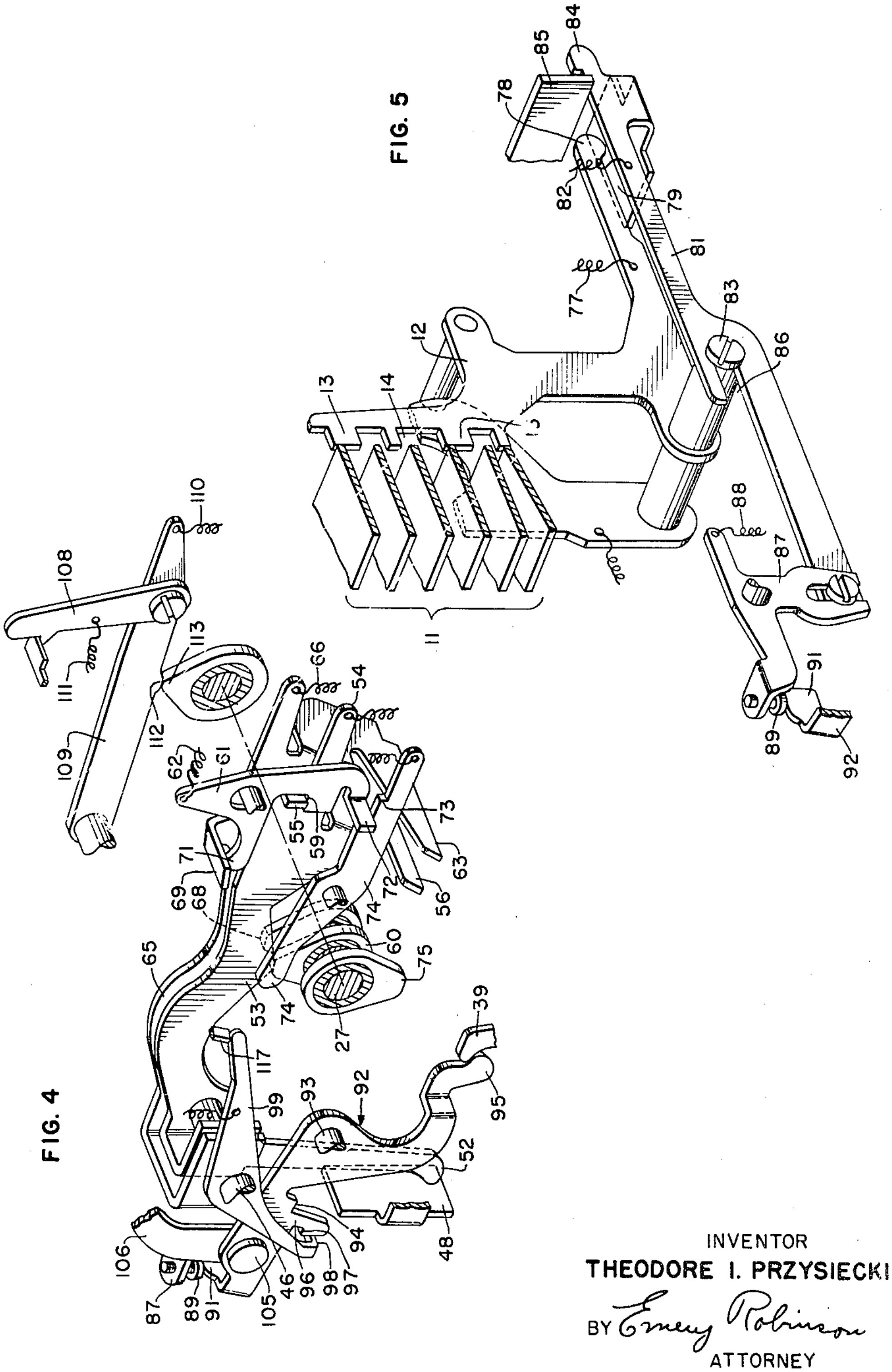
Figure 6:
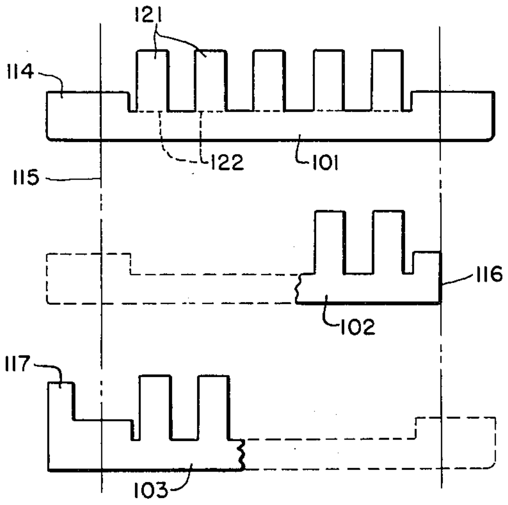
Figure 7:
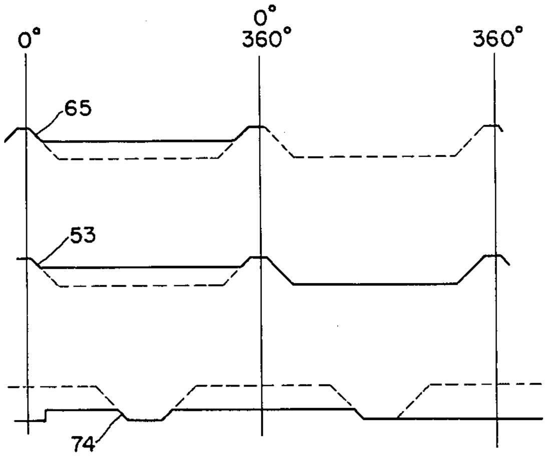

Still further objects of the present invention will reveal themselves during the course of the following detailed description having reference to the annexed drawings in which like reference numerals have been employed to designate corresponding parts throughout, and in which:

Fig. 1 is an exploded perspective view diagrammatically illustrating certain portions of a conventional keyboard transmitting apparatus having applied thereto various features of the present invention, Fig. 2 is a fragmentary side sectional view of certain of the apparatus illustrated in Fig. 1, Fig. 3 is a fragmentary plan view of the apparatus illustrated in Figs. 1 and 2, Fig. 4 is an exploded perspective view of certain of the operating and control levers detached from the adjacent apparatus, Fig. 5 is a fragmentary perspective view of certain portions of the selector mechanism in a conventional design of automatic telegraph page printer, Fig. 6 is a composite diagrammatic chart illustrating certain structural differences in the interchangeable warded storage code members of the identification signal transmitting drum assembly, and Fig. 7 is a coordinated timing diagram to which reference will be had during the course of the description of operation.

In its preferred embodiment this invention has been designed for application to a commercial type of page printing telegraph apparatus having a keyboard attachment of the type illustrated in U. S. Patent No. 1,904,164, issued in the name of S. Morton et al. The printing mechanism or type basket of this apparatus is capable of moving bodily from side to side longitudinally of a printing roller or platen for the purpose of producing lines of printing transversely on a page or web of paper. The transmission of each character code signal results in the selection of its related type element and is accomplished by the use of a series of tiltable selector vanes. This series of vanes is disposed across the width of the machine so that each permutative setting is imparted to a series of mobile transfer levers carried by the type basket or printing carriage. The tilting feature of these selector vanes is also utilized in the establishment of certain function selections by presenting against them selector bars having edges characteristically notched and baffled so as to respond selectively to a related placement of the selector vanes.

In the accompanying drawings the series of selector vanes have been designated 11 in Fig. 5 while a representative one of the general class of selector bars designated 12 also shown in Fig. 5 will be understood to possess a characteristic distribution of lugs and notches 13 and 14, respectively. A particular selector lever 12 is designed so that it alone among others will respond to a certain pair of initiating signals, in the instant contemplation the "figures shift" and "letter D" signals, which establish a selective condition at the called station apparatus in a manner of which will be more fully explained hereinafter.

Certain elements of the keyboard portion of this station equipment are illustrated by fragmentary representations in Figs. 1 and 2 whereat a set of manually operable key levers have been designated 15 disposed in parallel alignment over a transversely disposed set of code bars 16. The code bars 16 are disposed in supported confinement so that they may be shifted longitudinally to and fro between alternative extremities of position. The upper edges of the code bars 16 are characteristically toothed with variously inclined saw tooth edges so that upon the depression of each key lever 15 there will result an individual and related disposition of the several code bars 16 symbolic of its permutative code combination of marking and spacing signal components.

At one end the code bars 16 are provided with pairs of spaced coupling pins 17 or other suitable connecting attachment articulating them with their transfer levers and for transmitting their respective positional placement to the corresponding series of transfer levers 18, all pivoted on a common axis 19 and provided at their uppermost extremities with similarly profiled hook portions 21 and with locking projections 22.

In accordance with their related setting the transfer levers 18 may be disposed alternatively in the position in which they are shown in Fig. 2 whereat their hook portions 21 are disposed to clear the extremities 23 of gooseneck levers 24, which are spring urged in a counterclockwise direction about their common pivot 25. When thus unimpaired, levers 24 may be permitted to rise successively, each during its characteristic interval in a selecting cycle. Otherwise, when the ends 23 of said gooseneck levers 24 are obstructed by the alternative disposition of their related transfer lever when its overhanging hooked extremity 21 is moved to the left of the position in which it is shown in Fig. 2, said levers will be prevented from so responding during their characteristic intervals of each selecting cycle.

During each interval when a gooseneck lever 24 (Fig. 1) is permitted or prevented from rotating counterclockwise as described, which time interval is determined by the length and occurrence of its angular arc in timing cam 26 of the transmitter cam shaft designated 27, a dwell portion on the periphery of its related timing cam is presented beneath the follower projection 28 of the gooseneck levers. These presentations occur successively during allocated intervals of time in each signal cycle which corresponds to a single revolution on the part of shaft 27.

When, during its signal interval a gooseneck lever 24 is permitted to rotate, its contact pair 29 becomes momentarily closed transmitting an impulse characteristic of closed or "with current" condition, whereas if the lever is prevented from so responding the contact pair 29 is held open resulting in the transmission of an impulse of the opposite or "no-current" signal condition.

For the purpose of the present invention the gooseneck levers 24 are provided each with an additional probing extremity carried by a rightwardly extending and reversedly curving portion 31 disposed after a manner best illustrated in Figs. 1 and 2 whereby to encounter successively the coded ward elements which are carried by the answer-back message storage drum 32 pivotally supported on an axial shaft 33.

During the dormant or inactive condition of this answer-back signal transmitting accessory the storage drum is so disposed that no blocking engagement is interposed before the probing extremities 31 of any of the goose neck levers 24. This may be accomplished by establishing a home or zero position for the drum 32 in which the particular radial slot 34 which is then disposed to align with the probing extremities 31 is vacant or unoccupied by a ward bar 35 or if so occupied then by a ward bar 35 having all of its projecting wards removed.

During all other sensing positions of drum 32, or during as many of them as may be required for the purpose of transmitting the particular identification message which is to represent any particular called station the ward bars 35 are provided with variously disposed blocking and clearing warded extremities each in accordance with a pre-established code combination which will thereupon resolve the consequent disposition of its related gooseneck lever 24 when its allocated signal interval occurs during the cycle of revolution of shaft 27.

In order that the automatically transmitted identification signal borne by the message storing drum 32 may be assured noninterference, as by the inadvertent operation of the keyboard during its execution, provision has been made for locking all of the transfer levers against assuming their counterclockwise or gooseneck lever blocking positions. For this purpose a bail lever 37 has been provided also pivoted on shaft 19 and normally urged by a spring 38 into its ineffectual position. Through a train of linkage, which will be described later and which acts upon arm 39 to rotate bail lever 37 clockwise about pivot 19 in opposition to its spring 38, transversely extending bail portion 41 is moved to the right as observed in Fig. 2, gathering all of the transfer levers before it as it does so and retaining them in their unblocking position so that they will be out of interference with the gooseneck levers 24 when the latter are sensing the storage message of the drum 32.

Since both of the transmitting drums 32 of the called as well as of the calling stations are released for rotation by the inquiry signals emanating from the calling station transmitter, means have been provided for shunting the calling station contacts 29 so that its operation is idle. This is accomplished by providing a pair of shunt contacts 42 which bridge the transmitting contacts 29 of the calling station. The shunt contact operation is one of conditioning a locking bail under control of the calling station keyboard and then executing its movement by a power stroke of the print mechanism.

A spring-biased operating member 43 is supported in a vertical position after the manner indicated in Figs. 1 and 2 with a transversely extending guide rod 44 passing through an uppermost elongated opening 45 therein and with a common pivotal shaft 46 passing through an enlarged central aperture 47 therein. The opening 45 is of sufficient length to permit operating member 43 to undergo limited vertical motion sufficient to permit its transversely extending operating extremity or interponent 48 to depress the insulation block 49 to close the contact pair 42. Moreover, the aperture 47 is sufficiently wide to permit operating member 43 to be reciprocated sidewardly between the position in which it is shown in Fig. 2 in solid outline and one to the left thereof as suggested by the displaced dotted outline of its operating extremity 48.

A spring 51 connected to a sidewardly extending ear formed integral with member 43 biases the latter member to its inactive or uppermost, and to the right, position which is the one referred to as designated in solid outline in Fig. 2. As a consequence of having received an identification inquiring signal there is provided apparatus which will cause the shifting of member 43 to its effective position, shown in dotted outline followed in quick succession by a downwardly depressing action which will cause it to close the shunt contact pair 42.

The shifting and depression of member 43 to its effective position is the result of a selecting operation in the printing apparatus manifest by the rocking clockwise of a bell crank lever 53, one arm of which designated 52 (Figs. 1, 2, and 4) terminates in a lobe which impinges against a lower end or interponent portion 48 of member 43 and another arm of which carries at its distal extremity the spring loading ear 54, the latchable sidewardly bent lug 55 and the "letter D" code probing bail 56.

This bell crank 53, better visible in Figs. 1, 3, and 4, is pivotally supported upon the common rock shaft 46 and is biased by the spring carried on its extremity 54 in a clockwise direction as viewed in Fig. 2. It is prevented from attaining its clockwise extremity except when the transfer levers 18 are so singularly disposed as to present their coded notchings 58 in a transverse alignment which will permit the reception thereinto of the probing bail 56. This clockwise movement is also prevented by the shouldered extremity 59 of a blocking lever 61 which is normally urged by its biasing spring 62 into the position for blocking the latching extremity 55.

The particular selection whose characteristics are such as to dispose all of the code signal responsive elements including the transfer levers 18 in such a manner that they will present their notches 58 in alignment for the reception of probing bail 56 is the second one of a series of signals consisting in the instant embodiment of two code combinations, figures shift and letter D. The first of these signals or figures shift will result in the placement of the transfer levers and their notches 58 in such a manner as to permit the reception thereinto of another probing bail designated 63, Figs. 1 and 2. When this code signal is followed by any other signal than "letter D," the one necessary for the selection of the other bail 56, blocking lever 61 becomes restored to its blocking position and thus bell crank 53 is again prevented from movement. This restoration occurs when during a secondary selecting cycle cam 68 restores bell crank 65 followed by a release of latch 74 by cam 75, as will become evident.

In order to make certain that the answer-back responsive mechanism be not inadvertently initiated, the conditioning signal-code-combination signals, in this instance two, for accomplishing the selection are advisedly chosen to be such that under normal transmission their succession of occurrence is unlikely. With this in mind, the code combination signals here employed are the figures shift signal followed by the letter "D" signal. These codes will also be designated as the figure shift letter "D" selecting combination, or "figures-D."

When, at the calling station the transmitting operator depresses his figures shift key followed by the letter "D" key, he establishes upon his own apparatus mechanically by the selection of the probing bail 56. These selections follow each other and are performed by the short arcuate selecting segments generally designated 64 and integrally formed with the transfer levers 18.

As a consequence of the selection of probing bail 63, its related bell crank lever 65, Figs. 1 and 3, will be permitted to respond to the urge of its loading spring 66 and move clockwise when during the course of the ensuing cycle the cam follower portion of the lever 65 which follows the periphery of cam 68 rides off the apex which normally holds lever 65 in its upward or poised condition. As a consequence of the aforedescribed movement on the part of lever 65 a sidewardly extending lug 69 (Fig. 4) thereof encounters the extended arm 71 of a blocking lever 61 and since the spring 66 influencing lever 65 is more powerful than spring 62 it causes lever 61 to be rotated counterclockwise.

Because of the aforedescribed movement on the part of blocking lever 61, two conditions result which enable the subsequent selection of probing bail 56 provided that the ensuing signal is none other than letters "D". First, a sidewardly bent latchable lug 72 integral with lever 61 is moved rearwardly until it is caught and latched behind the shoulder 73, see also Fig. 4, of a spring loaded latch lever 74. Then, as a consequence blocking lever 61 becomes displaced so that its blocking shoulder 59 is withdrawn from the path of sidewardly extending lug 55 already described as being a part of the selectable bell crank lever 53. This clears the path for the second probing bail 56 and permits that element to move into the alignment of notches 58 in the transfer levers 18 when the ensuing signal "D" is received.

The cam shaft 27 ordinarily rotates in single revolution cycles, being released for each revolution as a result of the operation of any key lever by a well known trip mechanism coincident with the transmission of each code combination signal. The cams carried on its closely spaced cluster include those which time the gooseneck levers 24 during 360 degrees of rotation. An additional cam designated 75 carried by this shaft has its apex disposed so as to be effective at 180 degrees from starting position. Its function is to actuate latch lever 74 against the influence of a return spring for the purpose of releasing blocking lever 61. When this happens during the cycle in which "figures" shift bell crank lever 65 has been selected, the release of latch lever 61 is prevented because said lever 61 continues to be held in its counterclockwise or unblock position by reason of the engagement of bent-over lug 69 of lever 65 with the extended arm 71 of the blocking lever. Meanwhile cam 75 passes on and latch lever 74 resumes its latch position.

At the conclusion of each cam shaft cycle, a cam 68 on shaft 27 restores bell crank lever 65, freeing its retaining effect upon latch lever 61 so that upon a subsequent rotation of shaft 27, cam 75 acting on latch lever 74 will release blocking lever 61 to its normal or blocking position as regards the secondary selectable bell crank 53. From this it is to be understood that blocking lever 61 is normally disposed to prevent the selective response of secondary selection bell crank 53 unless the signal thereof, namely "D," which would prepare the notches 58 for the reception of its probing bail 56 is preceded by the assigned preparing signal which will operate to withdraw the blocking lever 61. When, therefore, the two chosen signals succeed each other in proper order, bell crank lever 65 is operated as a consequence of the selection of its probing bail 63, latch and blocking lever 61 is gotten out of the way, letter "D" selecting bell crank 53 is then permitted to respond to its signal.

After both of these signals have been received at the called station, a set of preparatory conditions is established, assuring for the uninterrupted exclusive allocation of the communication channel to the automatic answer-back mechanism by effecting a locking up of the manual keyboards at both calling and called stations, and by a shunting of the calling station transmitting contacts 29 so that its drum rotation will be idle or ineffective. This is accomplished in the following manner.

As a result of the operation of bell crank lever 53 at the calling station its arm 52 displaces the interponent 48 of member 43, after the manner already described resulting in the preparation for closure of contact pair 42. Upon this limited rotation of lever 43 in a clockwise direction, the lever 43 will be latched in its clockwise position by a latch lever 125 pivoted to the frame at 126 and biased counterclockwise by a spring 127 through the coaction of notch 124 of lever 125 and lateral portion 123 of lever 43. As will presently appear, the closure of contacts 42 shunts the calling station transmitter contacts so long as member 43 continues to be depressed. The initial actuation or depression of member 43 is brought about as a result of its being shifted from the righthand or solid outline position to the left or dotted outline position respecting the showing of this member in Fig. 2, followed by the downward movement or depression of member 43 by a power adjunct of the printer unit which will now be described.

When the keyboard operator at the calling station actuates his identification inquiry signals, "figure" shift and "D," these codes are impressed upon the receiving distributor at the destination station as well as in his own printer unit. As a consequence, the selector vanes 11 (Fig. 5) become placed into a characteristic disposition because of the six vanes, five respond to the code combination for the letter "D" while the sixth is previously conditioned by the preceding "figures" shift code combination after the manner described in the already referred to U. S. Patent No. 1,904,164. As a result of this characteristic placement, a certain selector bar or function lever 12 becomes eligible for selection due to the fact that its wards and notches 13 and 14 correspond with this particular placement of the vanes 11. As a result the selector bar 12 rocks counterclockwise as viewed in Fig. 5 moved by its spring 77 withdrawing the lobe 78 from plate 79 of companion lever 81.

As a consequence, companion lever 81 is permitted to respond to the urge of its associated spring 82, which is somewhat weaker than spring 77 so that lever 81 rotates slightly around its pivotal center 83 presenting a shoulder 84 into the path of the operating bail 85 which is part of the power driven mechanism of the printer unit and corresponds to bail 188 illustrated in the referred to Patent No. 1,904,164. The operative stroke of bail 85 is rightward as viewed in Fig. 5 so that upon engaging shoulder 84 of companion lever 81 the latter member will be shifted rightwardly as permitted by the elongated slot 86 imparting counterclockwise rotation to the bell crank lever 87.

This power stroke causes bell crank lever 87 to work against the influence of its restoration spring 88 and to forceably depress the head of an adjustable screw 89 thereof against the projecting lobe 91 of a dual purpose lever 92 which is pivotally carried on a rod 93 that juts out of the side frame. This power stroke causes lever 92 to be rotated counterclockwise about its pivotal center 93 engaging with its shoulder 94 the recently displaced interponent 48 of thrust member 43 and supplying the motion necessary to cause it to actuate and close the contact pair 42.

As a further result of the rotation of the lever 92 a lobed extremity 95 encounters the arm 39 of bail lever 37, rotating the latter member clockwise as viewed in Fig. 2 about its pivot 19 and gathering with its bail rod 41 all of the transfer levers 18 to present them out of the path of the blocking shoulders 23 of the gooseneck levers 24. This prevents the keyboard from being operated since the displacement of the transfer levers 18 through their articulation as at 17 with the code bars 16 results in an effectual locking of the latter members in their lefthand position as viewed in Fig. 2.

Beyond the bail rod 41 is a clutch trip continuation designated 40. This element constitutes an offset portion of the bail 41 disposed to engage a projection 40*a* of a bell crank lever 40*b*, which will permanently depress the clutch trip arm 132 so that the transmitting cam shaft 27 will have continuous rotation during the period of time occupied by the answer-back signal. The duration of this period is concluded when the multiple purpose lever 92 is released from its power stroke actuated position upon the termination of the message identification or answer-back cycle by a lug projection 117 (Fig. 1) which acts upon latch lever 99 to rotate lever 99 to release latch projection 98 from shoulder 97. When the lever 92 is thus permitted to return to its clockwise position (as shown in Fig. 2), then the member 43 is free to return, under the influence of its spring 51 to its upward and counterclockwise position (also shown in Fig. 2).

However, this return of lever 43 is achieved in the following manner: It will be recalled that when lever 43 was rotated to present its portion 48 from the solid line to the dotted line position (Fig. 2), the latch lever 125 coacted with portion 123 to hold lever 43 in its clockwise position. Then, when lever 43 was depressed the portion 123 was retracted from shoulder 124 to permit lever 125 to rotate about pivot 126 under the influence of spring 127 until lever 126 was arrested by the stop 128 fixed to the frame of the machine. It is to be noted here that the distance 100 (Fig. 2) between the interponent 48 and the shoulder on insulating block 49 is significant, because after member 43 has been depressed by lever 92 to close contacts 42, the portion 123 is moved out of engagement with the latch shoulder 124, whereupon spring 51 will rotate member 43 counterclockwise until interponent 48 takes up the clearance 100 and engages the shoulder of block 49, at which time the lateral portion 123 will be moved out of register with the latch shoulder 124 and instead engage the lower edge of the lever arm of lever 125. Then, upon the return of member 43 to its upward position under the influence of spring 51, lever 125 will be rotated to the position shown in Fig. 2.

This placement of lever 92 is prolonged after the power stroke is withdrawn by a latching arrangement. A depending arm 96 of lever 92 is provided with a latching tooth 97 which becomes lodged behind a lug 98 which juts sidewardly from a latch lever 99 spring urged in a counterclockwise direction about its pivot on shaft 46. After the storage drum 32 has completed an angular amount of rotation, equivalent to a station identification message cycle, which is to say, after it has presented all of its code bars 101, 102 and 103 to the sensing extremities 31 of the transmitter contact operating goosenecks 24 it will arrive at a position which is the end of the station identification message, which is the one in which it is shown in Fig. 2 whereat a particular one of the code bars designated 103 whose foremost extremity 117 extends farther than do the other code bars 101 and 102, engages with such extremity the end of lever 99. This rocks the latter member counterclockwise about pivot 46 and releases latch tooth 97 and consequently lever 92 to normal condition.

From the foregoing, it is observed that it is possible to embrace one or more answer-back messages (such as station identification) on the drum 32 depending upon the positions of the extremities 117. For example, if an answer-back message comprises approximately 21 characters, only one extremity 117 is needed. Moreover, if an answer-back message comprises seven characters, then three extremities 117 are used (seven characters apart). In the former example, the drum 32 will make one complete rotation per message cycle, and in the latter example, the drum 32 will make only one-third of a complete rotation for each message cycle. Furthermore, the length of answer-back messages controlled by the drum 32 need not be of equal length, but instead may be of variable length as determined by the angular positionments of extremities 117. Of course, the total number of character positions on drum 32, although indicated in the present embodiment as 21 positions, may be any other number of angular or character positions within reasonable limits.

It may be noted that multiple purpose lever 92 receiving its power stroke from the operating bail 85 of the printer moves into its counterclockwise extreme position and is latched thereat by latch lever 99 establishing electrically a shunt condition for the transmitting contacts 42 that shunts the calling station transmitter and also that it effectually locks the keyboard mechanism and prevents the transfer levers from interfering with the performance of the gooseneck levers 24 during the time that the stored message transmitting drum 32 takes over.

There is yet another function which is performed by the multiple purpose lever 92 which takes place as a result of its initial rotation counterclockwise and this will now be described.

At 105 there is pivoted to the side of lever 92 a spring biased pawl 106 whose single feed tooth 107 is disposed to engage the sidewardly extending extra length of one of the code bars 101 presented in the particular position for this purpose. At this stage in the cycle of drum 32 also referred to as one of its initial station identification positions, the bar 103 has released lever 92 from its preceding lock up condition. As a result the counterclockwise rotation of lever 92 acting through pawl 106 imparts a single step movement to drum 32 moving it from home position to its number one transmitting position. This is the sole purpose of pawl 106 since at all other times the feeding or advancing of the transmitting drum 32 is a function executed by a principal feed pawl 108 pivotally carried on a stroking arm 109 and biased in a counterclockwise direction by a spring 111.

Stroking arm 109 is pivotally carried on shaft 46 and includes a follower projection 112 which rides the periphery of a cam 113 provided with a single apex for imparting reciprocal motion to said arm 109 in opposition to its return spring 110. Each of the coded bars 101, 102 and 103 is provided with sufficient length in the direction which extends into the path of feed pawl 108 to be engaged thereby, with the exception of one bar that happens to be disposed radially in alignment with the tooth of the feed pawl 108 at the time that the drum 32 is in its home position. This particular bar is purposely fore-shortened, however, so that upon arriving at home position the further actuation by cam 113 of arm 109 and pawl 108 will cease to advance the rotation of drum 32, the latter having completed a full cycle of rotation. Otherwise stated, cam drum 32 is brought to rest after the full message has been transmitted which comprises all or as many of the bars 101, 102 and 103 as are devoted to the answer-back objective.

Referring now more particularly to Fig. 6 attention is directed to the structural variations between bars 101, 102 and 103 by reason of which the stepping of the drum 32 is regulated with regard to initial stepping pawl 106 and normal feed pawl 108, Figs. 1 and 2. Also it will be explained that detenting is accomplished by the action of a detent arm 110. The general class of bars is represented by the one designated by the reference numeral 101. This bar is provided with an extending portion 114 which protrudes beyond the left drum disc 115 so as to lie in the path of start or stepping pawl 106. Although pawl 106 is effective only during the initial stepping operation, the extending portions 114 on the remainder of the bars will serve merely the idle purpose of camming or clicking pawl 106 out of the way as they proceed in a step-by-step manner rotating counterclockwise as observed in Fig. 2.

A certain one of the bars such as the one designated 102 is foreshortened as at 116 so as not to extend into the range occupied by the conventional feed pawl 108 when the drum 32 arrives at its home or zero position.

This is for the purpose of rendering further operation of pawl 108 idle and for bringing the drum 32 to rest. Yet another bar such as the one designated 103, see also Fig. 2, is provided with a somewhat oversized projection 117 by reason of which it may positively engage the end of release latch 99 just as the drum 32 reaches home or zero position. The several bars are contained between two or more radially slotted discs 118 and 119, Fig. 1, whereat they may be securely located and retained in any convenient manner as by encirclement with hoop or garter rings. Accordingly, for the purposes of changing the stored code message it is but necessary to spring the garter rings out of position to be able to remove any one or more of the coded bars or to interchange them as may be preferred.

Message storing drums constructed in accordance with these teachings posses among other advantages facility of adjustment, interchangeability of message characters and regularity in feeding since the number of steps which constitute each cycle of rotation is thus maintained in conformity with the number of code bars and since the ends of the code bars themselves constitute the engageable means whereby the feed pawl advances the code drum from one position to the next. If it is desired to have a code drum with, say, twenty code signals, then the dividing up of the periphery to accommodate twenty code bars concurrently establishes the twenty steps necessary to complete a cycle of revolution. In this way, even the problem of introducing variations in the number of code signals becomes singularly simplified. All that is required to make an established number of signal positions serve for any lesser number of signals is to supply blank insert bars or bars with the code projections entirely mutilated or removed so that the signal transmitter will issue a sequence of blank signals to fill out the balance of the message cycle.

In this connection attention is again directed to Fig. 6 where the reference numeral 101 designates a typical storage blank from which a code combination bar may be made for the metal storage transmitting drum according to the proposed features of construction. This bar is provided with five upstanding fingers or lugs 121, preferably rendered frangible from the main stock or body of the bar 101 by scoring or otherwise suitably weakening as at 122. This may be accomplished during the original stamping of these members or subsequently as by punching or milling, it being of importance to note that any practice of weakening need be but relatively minor so that during setting up a mechanic may by bending any one of the tabs 121 with a pair of pliers break them off the body stock according to any pattern of distribution required in accordance with a particular coded message. In this way, since the message characteristics are borne by inexpensive sheet steel stampings which may be quickly and easily replaced or interchanged during field adjustment the subject matter of the metal storage drum, whether it be for purposes of identification or other, will be observed to lend itself quickly and easily to revision or reformation at a minimum of cost.

There is also taught in accordance with the provisions of this invention improved principles of telegraph supervision whereby in response to certain types of control station initiation a remote printer may be disabled for the duration of a precise interval of time. In the instant case such control is coincident with the transmission of the inquiring or "who are you" signal to the called station. This has been done by devising a selectable auxiliary mechanism which is made responsive to a certain plurality of code combination signals when transmitted in a precise order. In the particular disclosure the ultimately operated or selected device is the bell crank lever 53 whose downwardly extending arm 52 displaces the interponent 48 to a position whereat it will receive a depression stroke by the shoulder 94 of the multiple purpose lever 92 power actuated by the printer bail.

It is to be observed from Figs. 1 and 3 that the depressible member 43 has been provided with a sidewardly bent lug 123 which serves two purposes. On the one hand, this lug serves as an attachment ear for the return spring 51 which raises the rod 43 to its normal level shown as in Fig. 2, when the multiple purpose lever 92 is restored. Also this spring urges rod 43 toward the right as viewed in Figs. 1 and 2 restoring it to its neutral or ineffectual position clear of shoulder 94.

In addition lug 123 provides an engagement shoulder for the latching tooth 124 of a latch pawl 125 pivoted at 126 and biased in a counterclockwise direction by a spring 127. When the interponent 48 becomes displaced leftwardly, Fig. 2, because of the action of downwardly extending arm 52 of bell crank 53 the toothed latch lever 125 immediately engages the sidewardly extending lug 123 holding the depressible operating member 43 in its shifted or dotted outline position as observed in Fig. 2. The closing of the contact pair 42 does not become accomplished, however, until the power stroke has been transmitted thereto through the multiple purpose lever 92. Release of latch lever 125 is accomplished in a manner previously described at the conclusion of the answer-back message cycle when restoration latch 99 is actuated by an answer-back message terminating bar 103 having the enlarged lug 117.

*Operation*

The operation of a communication system employing an answer-back apparatus in accordance with the present invention will now be described having reference to Fig. 7, wherein a composite timing chart is portrayed to denote the sequence of responses, as concerns the principal transmitting shaft 27 which serves as a primary timing or sequence regulating device.

It is to be understood that in accordance with the contemplated system of operation station equipment such as that disclosed in the above referred to U. S. patent located at both the calling and called stations will be provided, each having keyboard transmitting and printing mechanism auxiliary equipment such as that disclosed in Figs. 1 and 4. The calling operator will initiate the answer-back cycle by first depressing the "figures shift" key lever 15. This will result in a shifting and consequent placement of the keyboard transmitter code bars 16 as well as a corresponding placement in the transfer levers 18. As a consequence, the selecting notches 58 in the segments 64 of the specially provided transfer levers 18 will present a clearance to the "figures shift" probing bail 63 while responding in its customary manner clutch release lever 131 will be depressed operating the trip lever 132 and causing to be withdrawn its declutching tooth 133. Thereupon, the clutch elements 134 under influence of their spring 135 will come together imparting rotation from the continuously rotating shaft 136 to the main cam shaft 27. This rotation will include but a single cycle of revolution because of the characteristic manner in which declutching lever 133 is permitted to resume its effective declutching position after each revolution.

As a consequence of the first cycle of rotation on the part of cam shaft 27, the apex of cam 113 will ride out from beneath the follower projection 112 of arm 109 (Fig. 4) imparting a single stroke actuation to stepping pawl 108 but this response will be idle because, as has been said, the feed tooth of pawl 108 is at this time disposed to engage the extending ends of the drum barrel 32 whereat a coded bar 102 is positioned which has no protrusion longitudinally beyond the storage drum disc 119.

In unison with cam 113, cams 60 and 68 will ride out from beneath their follower projections of bell crank levers 65 and 53, respectively, but of these, only lever 65 being presented with selecting clearance at notches 58 will undergo clockwise rotation after the manner indicated by timing chart curve 65 and as a result, the sidewardly extending lug 69 of lever 65 will rotate blocking lever 61 counterclockwise causing it to be latched when the sidewardly bent lug 72 thereof becomes lodged behind the shoulder 73 of latch lever 74. The "figures" shift bell crank lever 65 continues to remain in its selected position so that even though latch lever releasing cam 75 presents its apex at 180 degrees during the course of this cycle of rotation and trips latch lever 74, blocking lever 61 continues to remain in its unblocking position and the apex of latch tripping cam 75 passes by without producing any result.

As the end of its first cycle is approaching completion cams 60 and 68 of driven shaft 27 resume their normal condition at which their respective apexes engage and lift bell crank levers 53 and 65, the former to a partial degree of movement only, but the latter throughout its full return motion causing to be withdrawn the blocking lever operating lug 69 but blocking lever 61 continues to be held in its unblocking position because meanwhile, latch lever 74 has been restored to its effective position.

The calling operator will now depress the keyboard lever 15 which pertains to alphabetical character "D," and again clutch elements 134 will be tripped so that driven cam shaft 27 undergoes a second cycle of rotation. Meanwhile, the characteristic placement which has been impressed by key lever 15 of "D" upon the code bars 16 presents a clearance of notches 58 to the probing bail 56 of the "D" bell crank lever 53. As a consequence of riding out on the part of cams 60 and 68 from beneath their bell crank levers, lever 53 will now be permitted to rotate clockwise as viewed in Fig. 2. At this time the selection will be permitted for the further reason that its sidewardly extending lug 55 is not impaired by the blocking lever 61 which remains in its unblocking position as has been described.

This movement of the letter "D" selectable bell crank 53 about its pivot 46 is compelled by the relatively strong spring attached to its arm 54 whose tension is sufficient to overcome the restoring spring 51 of depressible member 43 and as a consequence the downwardly extending arm 52 of the aforedescribed bell crank will cause to be displaced the interponent 48 from its solid to its dotted outlined positions as viewed in Fig. 2. Following this displacement, latch lever 125 will slip behind the sidewardly extending lug 123 of member 43 and thereby serve to retain it in its ready condition even though bell crank lever 53 is promptly restored to its unselected condition at the conclusion of this cycle by the return of its restoration cam 60 of shaft 27.

Meanwhile, as a result of the normal responses of the transmitting gooseneck lever 24 acting upon their transmitting contacts 29 there will be caused to issue out over the line connecting the two stations the conventional five unit permutation code signals which pertain to the figures shift code as a consequence of the operation of the figures shift key lever 15, and that of the letter "D" code as a consequence of the operation of the letter "D" key lever 15.

At both, the calling and called stations, these signals will produce their customary effect upon the selector mechanism of the receiving printers. Accordingly, the selector vanes 11, Fig. 5, will become placed in a characteristic manner which will afford a clearance to the special function bar 12 so that that member will rotate counterclockwise under the influence of its spring 77 lifting its blocking lobe 78 from the plate 79 of a companion lever 81. When, therefore, during the course of conventional operation each printer power bail 85 receives its motor driven stroke rightwardly, as viewed in Fig. 5, it will engage the shoulder 84 of companion lever 81 rotating bell crank lever 87 in a counterclockwise direction as viewed in this illustration and imparting a power stroke through its adjustable screw head 89 against the lobe extension 91 of multiple purpose lever 92.

At the calling station the counterclockwise movement of multiple purpose lever 92, Fig. 1, will depress the shunt contact operating member 43, closing the contact pair 42 which shunts out the transmitting contacts 29 of the calling station keyboard transmitter. At the called station this condition will not obtain because its interponent 48 will not have been shifted to effective position. Lobe projection 95 will rock bell crank lever 37 clockwise about its pivotal center 19 sweeping all of the transfer levers 18 clear of their blocking position with respect to the gooseneck levers 24, and stepping pawl 106 which is pulled downwardly by the movement of multiple purpose lever 92 will thereupon advance the transmitting drum 32 from its home position to its number one code combination signal transmitting position.

As a further result of the motion imparted to bell crank 37 its clutch controlling extremity 40 will rotate bell crank **40*b* bodily withdrawing the declutch element 133 with the result that clutch members 134** will remain coupled for repeat cycle rotation for the duration of the answer-back signaling period.

Because of the action of latch lever 99 the power stroke actuation of multiple purpose lever 92 will remain effective until the transmitting drum 32 has completed a full cycle of rotation and until its extra length of code bar 103 has engaged latch lever 99 to release the multiple purpose lever 92 to its normal condition. During the answer-back period the rotation of transmitting drum 32 at the calling station and the sensing operation of its gooseneck levers 24 will be idle, however, since all of the transmitting contacts 29 at that station will have been shunted out on account of the closure of contact pair 42. At the called station, however, the action of its multiple purpose lever 92 will have no effect upon interponent 48 because no local keyboard operation will have been executed to cause the shifting of interponent 48 from its ineffectual to its effective position.

During the course of answer-back signal transmission jockey levers 110 at both stations spring urged in a counterclockwise direction as viewed in Fig. 1 will successively place behind each code bar extension 101, 102 and 103 and prevent the clockwise rotation of drums 32 as the stepping pawls 108 successively reciprocate between feed and return conditions. Also at both stations stepping pawls 106 will remain depressed and be successively cammed out of the way by the oncoming sideward extensions of the code bars without producing any consequent effect.

At the conclusion of the answer-back transmission from the called station, both transmitting drums 32 will reach their "answer-back end" position and will cause to be released their respective latch levers 99 for unlatching their respective multiple purpose levers 92, so that as a consequence, the two stations will remain connected for purposes of further normal communication one with another if the answer-back identification signal verifies the propriety of their connection. Otherwise the two stations may be disconnected at the election of either station's operator in accordance with the conventional exchange apparatus.

While the present invention has been explained and described with reference to particular details of construction and operation, it is to be understood, nevertheless, that numerous changes and modifications are susceptible of being incorporated without departing from the essential spirit or scope of the invention. Accordingly, it is not intended to be limited in an understanding of this invention to the particular language employed in the foregoing description nor to the pictorial illustrations in the accompanying drawings, except as indicated in the hereunto appended claims.

What is claimed is:

1. In a telegraph communication system including a calling station and a called station connected over a signal line, an answer-back mechanism at each station, each mechanism comprising in combination a keyboard transmitter portion and a receiver portion, said transmitter portion including an automatic stored-message transmitter device comprising a principal member mounted for rotation and having a cylindrical periphery formed with a plurality of radially spaced and longitudinally extending insert receiving slots, an insert for each of said slots and including a portion extending beyond said member, each of said inserts having frangible projections whereby it may be conformed to the code combinations of a telegraph symbol, a feed pawl for engaging said extending portion of each insert for imparting a step of rotary movement to said member so that the number of radial steps conform to the number of inserts in said member, power means for actuating said feed pawl, clutch control means for regulating the application of said power means to said feed pawl, means at each said calling and called stations responsive to signals initiated by said calling station for initiating the answer-back mechanisms thereat into operation, dually functional means in the receiver portion at each station, probing means at each station including members selectively operable sequentially in response to a predetermined succession of code signal combinations, said dually functional means effective substantially simultaneously under predetermined conditions of operation of said probing means to lock the keyboards at both said calling and called stations and to shunt the transmitting contacts at said calling station, whereby the called station alone is rendered effective to transmit over said signal line.

2. In a telegraph communication system including a calling station and a called station connected over a signaling channel, an answer-back mechanism at each station, each mechanism comprising in combination a dually controlled transmitting apparatus including a drum carrying a plurality of transmitting cams, one for each impulse of a code, a series of contacts, a corresponding series of contact operating levers controlled by said cams, a first set of code elements, a keyboard comprising key operated means for controlling said code elements, a set of transfer levers articulated to said code elements and adapted to control the response of said contact operating levers to said cams, an auxiliary transmitting drum comprising a second set of code elements, sensing means on said contact operating levers cooperable with said second set of code elements, coded facilities on said transfer levers, a pair of probing means cooperable with said coded facilities, means for effecting the sequential selection of said probing means, means for stepping said auxiliary transmitting drum, a normally key operated single revolution clutch, means for effecting a predetermined number of successive operations of said clutch in response to the successive operation in a predetermined sequence of said probing means, means at each said calling and called station for initiating the answer-back mechanisms thereat into operation, and dually functional means at each station, said dually functional means effective substantially simultaneously under predetermined conditions of operation of said probing means to lock the keyboards at both said calling and called stations and to shunt the transmitting contacts at said calling station, whereby the called station alone is rendered effective to transmit over said signal line.

References Cited in the file of this patent

UNITED STATES PATENTS

| | | |
|---|---|---|
| 1,785,940 | Ennes | Dec. 23, 1930 |
| 1,821,110 | Morton et al. | Sept. 1, 1931 |
| 1,879,524 | Salmon et al. | Sept. 27, 1932 |
| 1,909,838 | Lane | May 16, 1933 |
| 1,960,360 | Watson | May 29, 1934 |
| 2,015,323 | Singer et al. | Sept. 24, 1935 |
| 2,115,185 | Weber | Apr. 26, 1938 |
| 2,147,249 | Franklin | Feb. 14, 1939 |
| 2,472,733 | Swan | June 7, 1949 |
| 2,545,207 | Martindell | Mar. 13, 1951 |
| 2,559,637 | Kirchel | July 10, 1951 |
| 2,568,264 | Zenner | Sept. 18, 1951 |
| 2,590,421 | Lanza | Mar. 25, 1952 |
| 2,613,265 | Halvorsen | Oct. 7, 1952 |

FOREIGN PATENTS

| | | |
|---|---|---|
| 466,673 | Great Britain | Jan. 30, 1935 |
| 493,500 | Great Britain | Oct. 10, 1938 |
| 543,617 | Great Britain | Mar. 5, 1942 |